ELECTRICAL DELAY LINE ASSEMBLAGE
Filed May 22, 1952 3 Sheets-Sheet 1
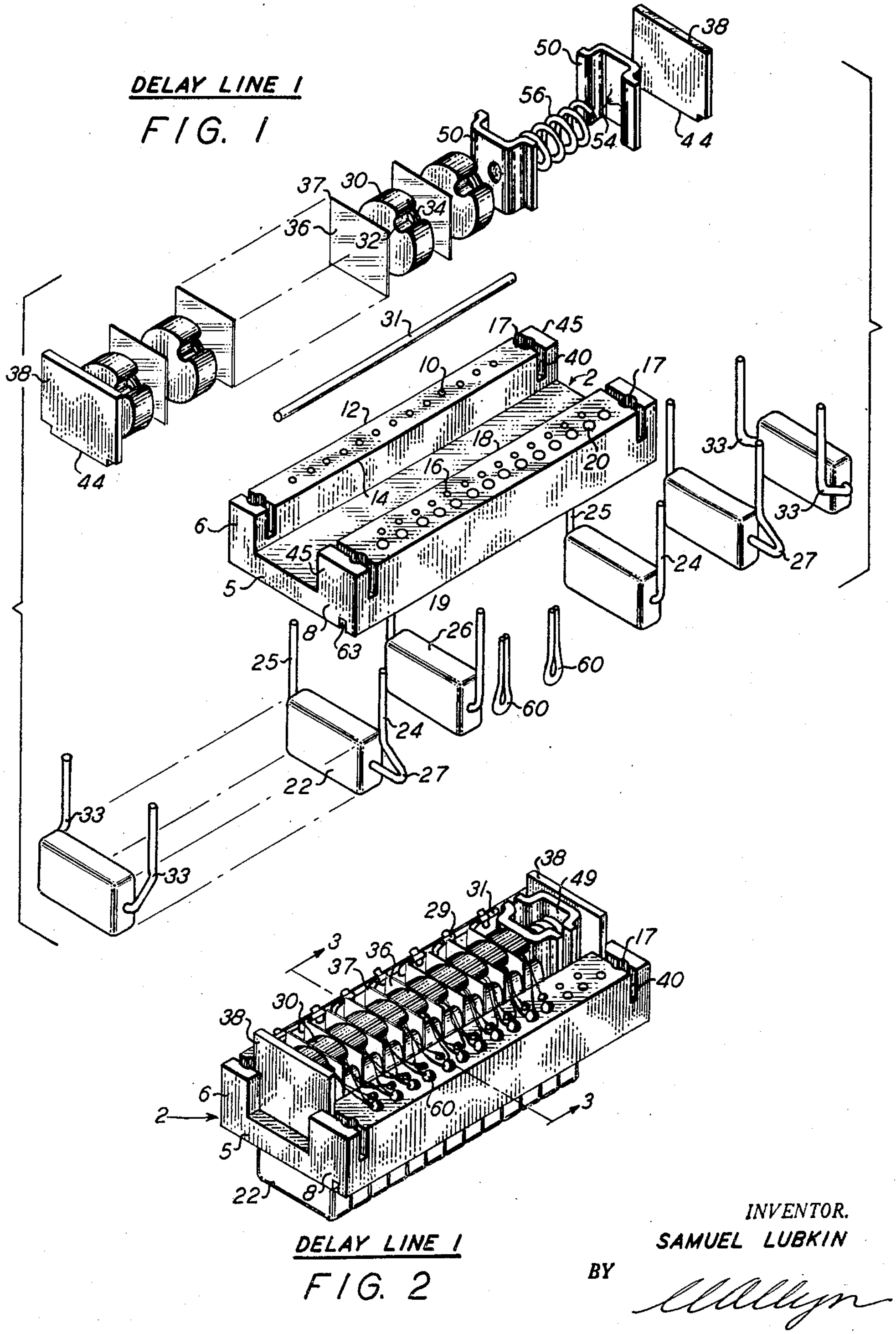
DELAY LINE 1 FIG. 1, DELAY LINE 1 FIG. 2
INVENTOR.
SAMUEL LUBKIN
BY [signature]
ATTORNEY

ELECTRICAL DELAY LINE ASSEMBLAGE

Filed May 22, 1952 3 Sheets-Sheet 2

DELAY LINE 1'

INVENTOR.
SAMUEL LUBKIN
BY [signature]
ATTORNEY

ELECTRICAL DELAY LINE ASSEMBLAGE

Filed May 22, 1952 3 Sheets-Sheet 3

INDUCTOR 30

DELAY LINE 1"

INVENTOR.
SAMUEL LUBKIN
BY
[signature]
ATTORNEY.

United States Patent Office 2,823,354
Patented Feb. 11, 1958

2,823,354

ELECTRICAL DELAY LINE ASSEMBLAGE

Samuel Lubkin, Brooklyn, N. Y., assignor, by mesne assignments, to Underwood Corporation, New York, N. Y., a corporation of Delaware Application May 22, 1952, Serial No. 289,236

22 Claims. (Cl. 333—29)

This invention relates to electrical delay lines and more particularly to a mounting assemblage for delay lines of the lumped parameter type.

A lumped parameter delay line, in one form, consists of a plurality of inductors in series, with a capacitor shunting each inductor to a common connection. In order to achieve maximum performance of the delay line, it is necessary that the inductors be arranged in such manner that a certain amount of mutual inductance will exist between the inductors.

One known way of obtaining the necessary mutual inductance is to place the inductors on a long cylindrical core of non-magnetic material. To complete the delay line, capacitors are connected between the junctions of the inductors and a common bus by means of connecting terminals.

The difficulty with this type of construction is that it necessitates the removal of a number of the inductors in order to repair or replace any one. Additionally, the use of connecting terminals between the capacitors and the inductor junctions increases the cost of labor and material. If it is necessary to provide for a tap to which an outside lead may be connected to the delay line, a capacitor support lug or a separate terminal is also usually required.

An object of the present invention, therefore, is to provide an improved mounting assemblage for lumped parameter delay lines which significantly reduces the cost of manufacture of delay lines of this type.

Another object of the present invention is to provide a method of construction of lumped parameter delay lines which facilitates the replacement of individual elements damaged during manufacture, testing or use, without disturbing other elements.

A further object is to provide a simple and inexpensive means for connecting a lead to a delay line of the lumped parameter type.

In accordance with the present invention there is provided a delay line comprising an elongated U-shaped mounting member made from insulating material and having a plurality of holes through each leg. Inductors, each comprising a coil winding mounted in a grooved face of a small cylindrical core, are separated from each other by spacers and are spring mounted adjacent to each other lengthwise between the legs of the U-shaped member, being held in place by fixed end pieces. A plurality of capacitors is arranged beneath the base of the member with each lead of each capacitor extending through a corresponding hole in each of the legs of the member. Each lead is bent at the exit of the hole to support the capacitor. One lead of each capacitor is connected directly to a lead of the associated inductor. The remaining leads of the capacitors are connected together.

A feature of the invention is the angular bending of a capacitor lead at the entrance of the hole in the mounting member to provide a tap for the delay line.

A suitable inductor assemblage of the above type is described and claimed in my co-pending application Serial No. 289,722, filed May 24, 1952. A suitable component assemblage of the above type is described and claimed in my co-pending application Serial No. 289,235, filed May 22, 1952, now Patent No. 2,778,977, issued January 22, 1957.

Other objects, features and advantages will appear in the subsequent detailed description which is accompanied by a drawing wherein:

Fig. 1 is an exploded view of a delay line of the lumped parameter type embodying the invention.

Fig. 2 is an unexploded perspective view of the delay line of Fig. 1.

Figure 3:
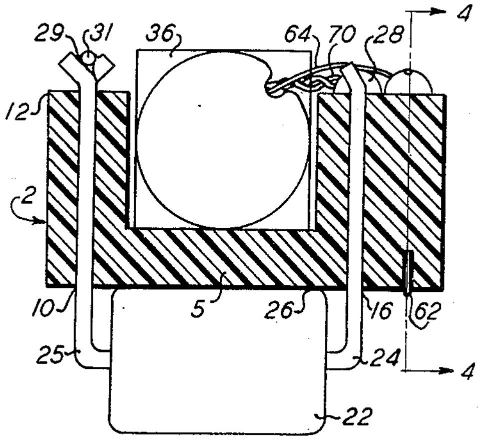
Fig. 3 is a sectional view of Fig. 2 along the lines 3—3 showing a feature of the invention.

Referring more particularly to the delay line 1 shown in Figs. 1 and 2, the elongated U-shaped mounting member 2 is constructed from a material having good electrical insulating and mechanical properties; for example, a phenolic material having a fabric base to provide mechanical strength.

The mounting member 2 comprises a base 5 and two legs 6 and 8. This shape may easily be achieved by milling out a rectangular cross section or channel from a solid block of material. The set of holes 10 is drilled vertically through leg 6 and lies on a line parallel to the edges 12 and 14 of leg 6, and midway between said edges.

A second set of holes 16 is drilled vertically through leg 8 and lies on a line parallel to the edges 18 and 19 of leg 8. A third set of holes 20 also extends vertically through leg 8 on a line parallel to the edges 18 and 19. The holes 20 are arranged at a greater distance from edge 18 than the holes 16, and are offset from the holes 16. Mounting holes 17, at each end of the member 2, are used to mount a cover plate (not shown) over the top portion of the delay line, and for supporting the delay line by means of suitable connectors inserted through the holes . The cover plate also functions to rigidly position the components mounted on the top of the member. A second covering plate may be similarly mounted over the components beneath the member to rigidly maintain them in position. The mounting holes 17 may be located at other suitable positions on the member 2.

The capacitors 22 of the delay line are arranged adjacent to each other beneath the base 5 of the mounting member 2. The capacitors 22 are in very close juxtaposition to each other in order to occupy a minimum amount of space. The leads 24 and 25 of the capacitors 22 extend through the holes 16 and 10 respectively and are bent angularly at the exit of the holes in order to support the capacitors in position (see Fig. 3), and function in place of separate terminal posts to receive the associated inductor leads. The holes 10 and 16 are chosen to be of such a diameter that the frictional contact of the leads with the inside surfaces of the holes also assists in supporting the capacitors in position during assembly. This is because the portion of the leads within the hole is often slightly bent.

The capacitors 22 are further maintained in position, with their upper edges 26 in surface-to-surface contact with the lower surface of base 5, by the solder portions 28 and 29 which are utilized primarily for electrical and mechanical connections. The ends of the leads 25 are preferably bent substantially normal to the edge 12, and alternately toward and away from edge 12 in order to provide mechanical support for connecting bus 31 before soldering. After soldering the leads may be clipped close to the solder joint. The solder portions together with the leads are of a larger cross section than the diameter of the holes and also function, in conjunction with the bus 31 connecting the bent ends of the leads 25 together, to prevent any forced withdrawal of the capacitors from the holes.

Where it may be necessary that certain sections of the delay line be tapped, the lead 24 (see Fig. 1) may be angularly bent to form a tap 27 before insertion into hole 16. The tap 27 thus provides a convenient place to electrically and mechanically connect a lead to the delay line.

The capacitors need not be mounted directly beneath the associated holes but may be mounted a short distance therefrom since the leads can be bent into an appropriate angular shape 33 in order to fit them into the holes. This is particularly true in regard to the capacitors at the end of the member and results in minimizing the requisite length of the mounting member.

This feature of the invention (the capacitor leads functioning to both support the capacitors and provide a terminal post for associated electrical connections) serves to significantly lower the cost of manufacture of delay lines of the lumped parameter type by reducing the amount of labor and material required to mount and support the capacitors and the terminal posts.

Referring again to Figs. 1 and 2, the inductors 30 are arranged adjacent to each other between the legs 6 and 8 of the mounting member 2. The inductors, which will be described more fully below, are constructed using small cylindrical cores 32 of magnetic material having a diameter slightly smaller than the channel width of member 2. The cores 32 each have a circularly grooved portion at one end to receive a coil winding 34 (see Fig. 5). The cores 32 (known as pot cores) are stacked on a common axis to form an elongated cylindrical assembly (see Figs. 1 and 2) and are spaced from each other by spacer sheets 36. The spacer sheets 36 are preferably rectangular rather than circular with a side dimension equal to or slightly larger than the diameter of the pot cores. The rectangular shape allows for conveniently changing the sheets when required by grasping the corner extensions 37 outside the periphery of the cores with a suitable tool. The spacer sheets are preferably of mica but other magnetic or non-magnetic material is suitable. If the total space occupied by the capacitors 22 exceeds the space occupied by the inductors 30 and sheets 36, the former will determine the overall length of the member 2, and the unused space in the channel between legs 6 and 8 may be filled by filler spacers (not shown).

The pot cores 32 are arranged between the identical end retaining plates or pieces 38. The end plates 38 are rigidly mounted in the transverse slots 40 which are of equal depth and are cut into the legs 6 and 8 on lines parallel to the edges 45 at the ends of the member 2. The end plates are shaped to have short bottom extensions 44 having a width equal to the linear distance between the inside edges 14 and 18 of the legs 6 and 8. The extensions 44 have a length equal to the distance between the lower edges of the slots 40 and the upper surface of the base 5.

The end plates 38 are thus rigidly fixed in position at each end of the member 2. The end plates, of course, may also be shaped to fit into suitable grooves in the inside portions of the legs. The plates may be mounted in appropriate transverse slots or grooves at points intermediate the ends of the member to accompany a set of inductors which occupy only a portion of the length of the member.

The spring retainer plates 50, arranged between the legs 6 and 8 and adjacent to one end plate 38, are of a spread U-shape. The purpose of this U-shape is to permit the insertion of a suitable tool to compress the spring 56 between the retainer plates in order to insert or remove individual inductor assemblages or mica spacers. Each retainer plate has a rounded boss 54 in the center thereof which function to retain the spring 56, mounted between the bosses 54, in position preventing lateral movement. A metal washer having grooved sides may also be used as a retainer plate. The compression device 49, comprising the combination of the spring retainer plates 50 and the spring 56, is mounted in series with the pot cores 32 and spacers 36. A suitable rubber washer in place of the spring and retainer plates may also be used to maintain the inductors in position. Similarly, the end plates 38 may also function as spring retainer plates utilizing a hollowed out portion to receive the spring 56.

Thus, all the components between the legs of the mounting member are held in position by the force exerted due to the compression of the spring. This method of construction allows for the replacement of individual pot cores and associated windings in case this becomes necessary during manufacture, testing, or actual use, without disturbing the associated inductors. (This would not be the case if a common tie rod were inserted through holes drilled in the center of the cores and tightened against appropriate end pieces fixed against shoulders on the mounting member to mount the cores.) Additionally, the delay line constants may be easily adjusted by varying the spacing between inductors as will be explained more fully below. Further, the spring maintains the spacing constant after adjustment irrespective of unequal coefficients of expansion of the different parts of the delay line.

In the construction of delay lines of the lumped parameter type it is frequently necessary to provide tie points for other leads of the inductors which are not connected directly to the capacitors. A feature of this invention which fulfills this requirement is shown in Fig. 4.

The tie point 60 is constructed by simply bending a piece of wire into a hairpin like element, that is doubling it back on itself, and inserting the bent wire open end first into the hole 20 through the entrance of the hole at the base 5. The open end 61 of the tie point is then spread to fix the tie point in position. The relationship of the cross section of the doubled wire portion and the diameter of the hole may be chosen such that bent portions intermediate the ends of the tie point will be in frictional engagement with the inside surface of the hole when inserted (see Fig. 1).

Figure 4:
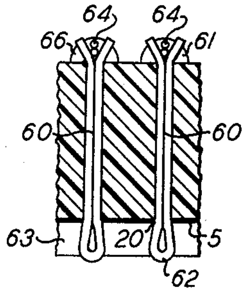
Fig. 4 is a fragmentary sectional view of Fig. 3 along the line 4—4 showing another feature of the invention.

As can be seen in Figs. 3 and 4, the loop or bent end 62 of the tie point 60 acts as a retaining head since the cross sectional area of the wire at this point is greater than the cross sectional area of the hole. The loop ends 62 are arranged in the slot 63 cut in the underside of the base 5 in line with the holes 20. The slot 63 is cut to have a width substantially equal to the diameter of the wire used to form the tie point and functions to maintain each loop 62 in the same position with respect to the slot, that is, with the two sections of wire comprising the tie point in line with the slot 63. This maintains the forked end 61 in position to receive the leads 64 of the inductors and prevents rotation of the tie point. The loop 62 may also function as a terminal for other leads.

The leads 64 are inserted between the legs of the forked end 61 and are frictionally maintained in position betwe n the sections of wire until soldering, without the necessity of twisting the inductor leads around the tie point. After soldering the free ends of the leads may be clipped at the solder joint. The solder portion 66 at the forked end 61 provides for electrically and mechanically connecting the lead 64 to the tie point. The solder portions 66 also operate to prevent the forced withdrawal of the tie points.

Thus, the tie point 60 is rigidly fixed in position by the loop end of the tie point at the entrance to the hole 20, and the wire fork and the solder portion at the other end. The tie point cannot turn in its hole since the bent head is fixed in the slot 63.

This aspect of the invention greatly simplifies the construction of the delay line with concomitant savings in labor, because of the simplicity of mounting of the tie point and the ease in supporting the leads of the inductor preparatory to soldering. Additionally, the cost of the wire comprising the tie point is negligible resulting in a further reduction in the cost of manufacture.

Figure 5:
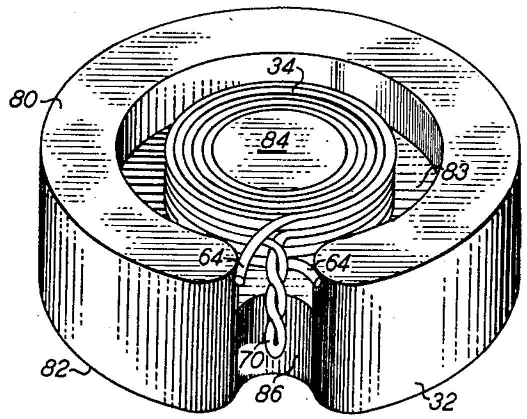
Fig. 5 is a perspective view of one part of a delay line section showing the inductor construction in accordance with the invention.

Referring to Fig. 5, the pot core and coil winding assemblage comprising inductor 30 is shown. The cylindrical core 32, made from a material having a high permeability and preferably of a low electrical conductance (a ferrite for example), has a circularly grooved face 80 and a plane face 82. The coil winding 34 is cemented in position completely within the groove 83 of the pot core 32.

The mounting method minimizes accidental breakage of the coil during construction of the delay line since the winding is fully protected within the groove.

The tap 70, which is connected to a turn of the coil winding and to which the capacitor 22 is connected, may be conveniently produced by twisting a portion of the wire of the coil winding to a suitable lead length at the appropriate time and position during winding of the coil. The end leads 64 of the winding are arranged near the tap 70 and the coil is mounted with the three leads extending through the opening 86 in one sector of the pot core 32.

Figures 6, 7:
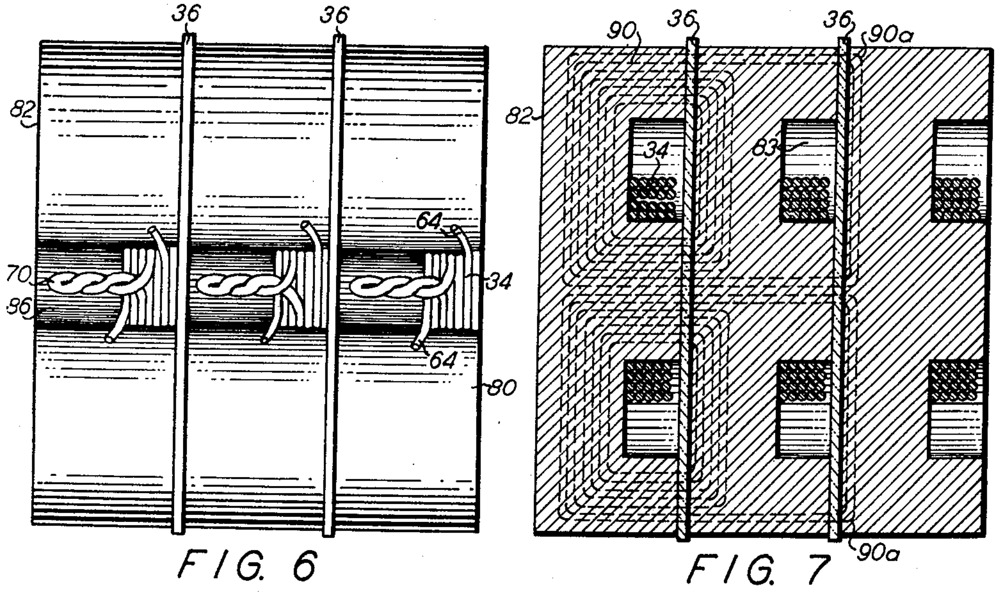
Fig. 6 is an elevational view of the inductor assemblage of one section of the delay line embodying the invention.
Fig. 7 is a cross sectional view of Fig. 6 along the vertical diameter of the inductor assemblage.

The inductors 30 are cylindrically arranged adjacent to each other with the grooved face of one core next to the plane face of the next succeeding core (see Fig. 6). The spacer 36, may be made of any suitable magnetic or non-magnetic material preferably electrically non-conducting, for example, mica. The spacers 36, which are mounted between the cores 32, are preferably of a square shape with each side approximately equal to the diameter of the pot cores. If necessary, the spacers may be made slightly larger than this in order to aid in eliminating variations in spacing of the cores due to burrs at the edges of the spacers. Undesirable variations in spacing would result if spacers having burred edges were circular of a diameter equal to or smaller than the diameter of the pot cores.

Figure 8:
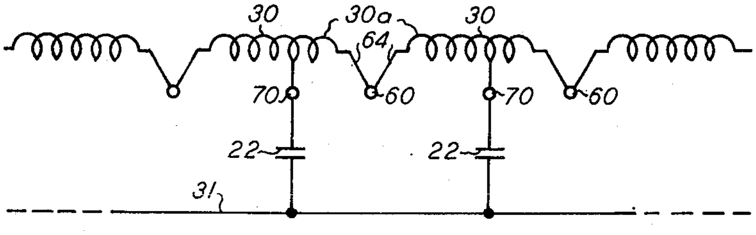
Fig. 8 illustrates the electrical equivalent of a portion of the delay line shown in Figs. 1 and 2.

The equivalent of an electrical section of the delay line 1 is shown in Fig. 8 where corresponding electrical parts of the delay line are designated by the same reference characters as are utilized in the description of the mechanical construction above.

The inductors 30 are in series connection, and the capacitors 22 are connected from the taps 70 on the inductors to the common connection 31. With this arrangement an electrical section of the delay line includes inductance **30*a* comprising segments of two adjoining inductors between the taps 70, and half of the capacitance of the capacitors connected to said taps. Therefore, in an electrical sense, the inductance 30*a* of one section of the line is made up of contributions of inductance from the adjacent inductors. Each capacitor contributes half of its capacitance to each of the adjoining sections. The end capacitors are chosen to have substantially half the capacity of the intermediate capacitors. Actual calculation indicates that for the usual assumptions the end capacity should be about 0.47 times the capacity of the intermediate capacitors for best results. The end leads 64 of the adjacent inductors are connected together at the tie point 60**.

Summarizing, the inductor 30, which comprises a complete tapped winding in a single pot core, contributes a portion of the inductance to two sections of the delay line. Therefore, mutual inductance exists between the adjacent sections of an amount determined by the position of the tap, since the tap position will determine the ratio of turns between adjacent sections. For example, if the tap is close to one end of the winding, the mutual inductance will be small, but if the tap is near the center of the winding, the mutual inductance will be large.

In order to accurately control the amount of mutual inductance between inductances **30*a***, it is necessary to minimize coupling between coil windings due to common flux linkages. To achieve this, the delay line is preferably assembled from two types of coil windings placed alternately in the cylindrical stack. They are identical in respect to the number of turns, size of wire and location of taps, but the coil windings are mounted so that the directions of adjacent windings are opposite; that is, if a winding is wound in a clockwise direction, the adjacent windings are wound in a counterclockwise direction.

In this way the external fields of a set of inductors have been found to almost cancel each other, and the mutual inductance between sections of the line is almost entirely due to the effect of the tapped coil arrangement.

Thus the invention provides an inductor assemblage for delay lines which allows for a maximum amount of inductance per section through the use of magnetic cores while providing the optimum mutual inductance between adjacent sections.

Close control over the inductance of each section is necessary in order to design and manufacture delay lines to particular specifications. Due to variation in the construction of the coil windings and the pot cores, and to the lack of complete uniformity of the magnetic properties of the core material, it is somewhat difficult to accurately predict the inductance of each core and coil winding combination. The invention provides a very convenient and simple way to adjust for any small variation in the requisite inductances.

Referring to Fig. 7, which illustrates a cross-section of the three inductor assemblages of Fig. 6, the magnetic circuit of each inductor generally comprises the continuous flux path 90 perpendicular to the turns of and around a cross-section of the coil winding and through two adjacent cores. That is, the backs of the first and second succeeding cores each provide a portion of the flux path.

Since the core material has a relatively high permeability, the major part of the reluctance in the flux path is in the gaps between the cores occupied by the non-magnetic spacers 36. If each gap is relatively small (for example, five thousandths of an inch), a small change in the gap will substantially affect the inductance. Thus, a very convenient and simple way to adjust the inductances is provided.

As explained above, mutual inductance between adjacent sections of the delay line is primarily determined by the position of the associated taps. However, it is desirable to minimize mutual inductance between non-adjacent sections due to proximity.

Since the core material provides a low reluctance path the major portion of the flux which produces mutual inductance will be between the parent core and the first succeeding core. The gap between the first succeeding core and the second succeeding core introduces a high reluctance segment which essentially causes the stray flux (flux path **90*a***) to be at a minimum. Hence, nearly all of the flux is threaded between the first core and the first succeeding core and a negligible portion of the flux is threaded between the first core, the first succeeding core and the second succeeding core.

Thus, mutual inductance due to coil winding proximity is reduced by each of the following features:

(1) By providing a relatively low reluctance path through the back of a succeeding core and by making the back as thick as possible consonant with the overall volume, thereby to reduce the number of flux lines which will pass through the middle leg and therefore the coil winding of the succeeding core.

(2) By the use of nonmagnetizable spacers between a succeeding core and the next succeeding core which increases the reluctance of the flux path that includes the middle leg of the succeeding core.

(3) By winding adjacent coil windings in opposite directions so that the mutual inductance is thereby reduced due to bucking as explained above.

Thus, each of the above features contributes to reducing mutual inductance due to proximity of the coil windings to allow the mutual inductance to be primarily determined by the position of the associated taps.

After the delay line is assembled the inductance is easily adjusted by varying the gap between cores by the simple expedient of inserting spacers of varying thickness between the inductors while the spring 56 is further compressed (see Fig. 2). Thus minor differences in inductance may be compensated for, and uniformity of inductance may be obtained.

If replacement of an inductor 30 is required, during manufacture or adjustment, the spring 56 is similarly compressed to allow easy accessibility. Since the coil windings, which may be of very fine and therefore fragile wire, are completely protected within the grooves of the pot cores, there is little danger of breakage by spacer replacement during adjustment of the delay line.

Another advantage of the invention is that the probability of electrical shorting to ground of the coil windings is minimized since the mounting member is chosen to have good electrical insulating properties, and if, as is preferable, the spacers are also made of insulating material, the cores are insulated from each other.

Figure 9:
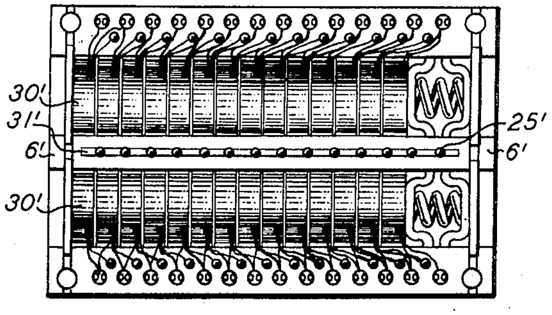
Fig. 9 is a plan or top view of another embodiment of the present invention.

Another embodiment of the present invention is shown in a top view of delay line 1' of Fig. 9 wherein corresponding parts of the delay line 1' are designated by the same reference numerals as in delay line 1, but with prime designations added.

Delay line 1' is substantially the same as delay line 1, the individual parts functioning in a similar manner but includes two adjacent units, each similar to delay line 1, with a common center leg 6'. The leads 25' of each of the capacitors 22' are inserted through the holes (not shown) in the leg 6' and bent at the exit to provide support, with two leads to each hole. The hole diameter is chosen to provide a close frictional engagement of the wires with the inside surface of each hole to provide additional support for the capacitors. Each lead 25' may be bent around the bus 31' and soldered to said bus. This connection also functions to prevent the forced withdrawal of the leads from the holes.

This type of construction provides for multiplying the number of individual delay line units to increase the total delay, and at the same time minimizes the amount of space occupied by the units.

Figure 10:
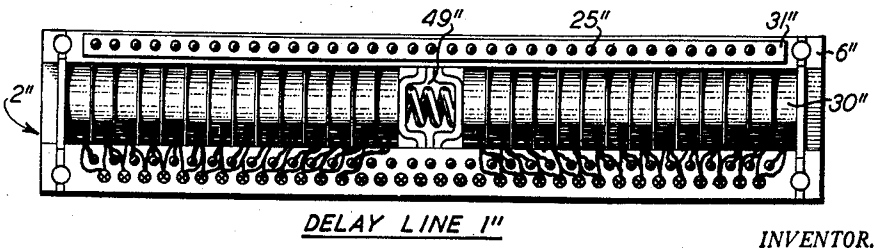
Fig. 10 is a plan or top view of a further embodiment of the present invention.

Another embodiment of the present invention is shown in Fig. 10 wherein corresponding parts of the delay line 1'' are designated by the same reference numerals as in delay line 1, but with double prime designations added.

Delay line 1'' is substantially the same as delay line 1 and the individual components function in the same manner. Delay line 1'' comprises two sequential units mounted on a common U-shaped mounting member 2'' with a common compression device 49'' intermediate the two delay line units. A perforated bus or strip 31'' (which is equivalent to the bus 31 of delay line 1) rests on the top surface of leg 6'' and receives the ends of the leads 25'', each of the leads being inserted through a hole and soldered to said strip. Alternately, the strip 31'' may be placed over all the extended leads prior to soldering and rested on the top surface of the leg 6''. The perforations in the strip are of a slightly larger diameter than the lead wire size. The strip 31'' functions the same way as connecting bus 31 of delay line 1, that is, it rigidly fixes the leads in position and prevents forced withdrawal of the capacitors. Delay lines 1'' may be mounted end to end preferably with single end plates between adjacent delay lines.

This type of construction thus provides for multiplying the number of individual delay line units to correspondingly increase the total delay, and at the same time minimizes the amount of space occupied by the delay line.

In the foregoing I have described my invention solely in connection with specific illustrative embodiments thereof. Since many variations and modifications of my invention will now be obvious to those skilled in the art, particularly combinations of the above embodiments, I prefer to be bound not by the specific disclosures herein contained but only by the appended claims.

What is claimed is:

1. An electrical delay line of the lumped parameter type comprising an elongated mounting member having a base and two legs, said member having a plurality of holes extending through the length of each leg, a plurality of capacitors arranged beneath the base of said member, the leads of each of said capacitors extending through corresponding holes in each leg of said member, a plurality of inductors arranged adjacent to each other and mounted between said legs of said member, and means for connecting said inductors to said capacitors together to form an electrical delay line.

2. An electrical assemblage comprising an elongated mounting member having a base and two legs, said member being made from insulating material and having a plurality of holes extending through the length of each leg; a plurality of capacitors arranged beneath the base of said member, the leads of each of said capacitors extending through in corresponding holes in each leg of said member to thereby mount the capacitors; a first end piece rigidly mounted at one end of said member, a second end piece rigidly mounted at the other end of said member, a plurality of inductors arranged adjacent to each other and mounted between said legs and in contact with said base and between said end pieces, the leads of each of said capacitors, straddling one of said inductors.

3. An electrical delay line of the lumped parameter type comprising an elongated mounting member having a base and two legs, said member being made from insulating material and having a plurality of holes extending through the length of each leg; a plurality of capacitors arranged beneath the base of said member, the leads of each of said capacitors extending through corresponding holes in each leg of said member; a first end piece rigidly mounted at one end of said member, a second end piece rigidly mounted at the other end of said member, a plurality of inductors arranged adjacent to each other and mounted between said end pieces and between said legs of said member, one of the leads of each of said inductors being directly connected to one of the leads of each of said capacitors, and a bus connecting the remaining leads of said capacitors together.

4. An electrical delay line of the lumped parameter type comprising an elongated mounting member having a base and two legs, said member being made from insulating material and having a plurality of holes extending through the length of each leg; a plurality of capacitors arranged beneath and in contact with the base of said member, the leads of each of said capacitors being supported in corresponding holes in each leg of said member to thereby mount said capacitors; a first end piece rigidly mounted at one end of said member, a second end piece rigidly mounted at the other end of said member, a plurality of inductors connected in series and arranged adjacent to each other and mounted between said end pieces in contact with said base and between said legs, one of the leads of each of said inductors being directly connected to one of the leads of each of said capacitors, a bus connecting the remaining leads of said capacitors together to form an electrical delay line, and a compression device arranged between one of said end pieces and an adjacent inductor.

5. An electrical delay line of the lumped parameter type comprising an elongated mounting member having a base and two legs, said member being made from insulating material, said member having a plurality of holes extending through the length of each leg; a plurality of capacitors arranged beneath the base of said member, the leads of each of said capacitors extending through corresponding holes in each leg of said member; a first end piece rigidly mounted at one end of said member, a second end piece rigidly mounted at the other end of said member, a plurality of inductors arranged adjacent to each other and mounted between said legs and said end pieces, one of the leads of each of said inductors being directly connected to one of the leads of each of said capacitors, a bus connecting the remaining leads of said capacitors together, and a compression device arranged between two adjacent inductors.

6. An electrical delay line of the lumped parameter type comprising an elongated mounting member having a base and three legs, said member being made from insulating material and having a plurality of holes extending vertically through the length of each leg; a plurality of capacitors arranged beneath the base of said member, the leads of each of said capacitors extending through corresponding holes in the outer and center legs of said member; a first pair of end pieces rigidly mounted at one end of said member, a second pair of end pieces rigidly mounted at the other end of said member, two sets of inductors, each of said sets comprising a plurality of inductors arranged adjacent to each other, each of said sets being mounted between said center and one of said outer legs and between opposite end pieecs, one of the leads of each of said inductors being directly connected to one of the leads of each of said capacitors, and a bus connecting the remaining leads of said capacitors together.

7. An electrical delay line of the lumped parameter type comprising an elongated mounting member having a base and three legs, said member being made from insulating material and having a plurality of holes extending vertically through the length of each leg; a plurality of capacitors arranged beneath the base of said member, the leads of each of said capacitors extending through corresponding holes in the outer and center legs of said member; a first pair of end pieces rigidly mounted at one end of said member, a second pair of end pieces rigidly mounted at the other end of said member, two sets of inductors, each of said sets comprising a plurality of inductors arranged adjacent to each other, each of said sets being mounted between said center and one of said outer legs and between opposite end pieces, one of the leads of each of said inductors being directly connected to one of the leads of each of said capacitors, a bus connecting the remaining leads of the said capacitors together, and a plurality of spacers separating said inductors from each other.

8. An electrical delay line of the lumped parameter type comprising an elongated W-shaped mounting member having a base and three legs, said member being made from insulating material and having a plurality of holes extending through the length of each leg; a plurality of pairs of capacitors arranged in pairs beneath the base of said member, the leads of each of said pair of capacitors extending through corresponding holes in the outer and center legs of said member to thereby mount said capacitors; the adjacent lead of each pair of said capacitors extending through the same hole in the center leg of said member; a fist pair of transverse slots at one end of said member, a second pair of transverse slots at the other end of said member, a first pair of metallic end pieces each rigidly mounted in one of said first slots, a second pair of metallic end pieces each rigidly mounted in one of said second slots; a first set of inductors arranged adjacent to each other and mounted between two of said end pieces and between said center leg and one of said outer legs, a second set of inductors arranged adjacent to each other and mounted between the remaining two end pieces and between said center leg and the other of said outer legs, one of the leads of each of said inductors being directly connected to one of the leads of each of said capacitors extending through the outer legs of said member, and a bus connecting the remaining leads of the said capacitors extending through the center leg together.

9. An electrical delay line of the lumped parameter type comprising an elongated W-shaped mounting member having a base and three legs, said member being made from insulating material and having a plurality of holes extending through the length of each leg; a plurality of pairs of capacitors arranged in pairs beneath the base of said member, the leads of each of said capacitors extending through corresponding holes in the outer and center legs of said member; the adjacent lead of each pair of said capacitors extending through the same hole in the center leg of said member; a first pair of transverse slots at one end of said member, a second pair of transverse slots at the other end of said member, a first pair of metallic end pieces each rigidly mounted in one of said first slots, a second pair of metallic end pieces each rigidly mounted in one of said second slots; a first set of inductors arranged adjacent to each other and mounted between two of said end pieces and between said center leg and one of said outer legs, a second set of inductors arranged adjacent to each other and mounted between the remaining two end pieces and between said center leg and the other of said outer legs, a plurality of mica sheets separating said inductors from each other, one of the leads of each of said inductors being directly connected to one of the leads of each of said capacitors, said inductor connected capacitor leads extending through the outer legs of said member, a bus connecting the remaining leads of said capacitors extending through the center leg together; and tie point means associated with the outer legs of said member to provide tie points for other leads of said inductors.

10. An electrical delay line of the lumped parameter type comprising an elongated W-shaped mounting member having a base and three legs, said member being made from insulating material and having a plurality of holes extending through the length of each leg; a plurality of pairs of capacitors arranged in pairs beneath the base of said member, the leads of each of said capacitors extending through corresponding holes in the outer and center legs of said member; the adjacent lead of each pair of said capacitors extending through the same hole in the center leg of said member; a first pair of transverse slots at one end of said member, a second pair of transverse slots at the other end of said member, a first pair of metallic end pieces each rigidly mounted in one of said first slots, a second pair of metallic end pieces each rigidly mounted in one of said second slots; a first set of inductors arranged adjacent to each other and mounted between two of said end pieces and between said center and one of said outer legs, a second set of inductors arranged adjacent to each other and mounted between the remaining two end pieces and between said center and the other of said outer legs, a plurality of mica sheets separating said inductors from each other, one of the leads of each of said inductors being directly connected to one of the leads of each of said capacitors, said inductor connected capacitor leads extending through the outer legs of said member, a bus connecting the remaining leads of said capacitors extending through the center leg together; tie point means mounted in other holes in the outer legs of said member to provide tie points for other leads of said inductors, and two compression devices, one of said compression devices being arranged between two adjacent inductors of each of said set of inductors.

11. An electrical delay line of the lumped parameter type comprising an elongated W-shaped mounting member having a base and three legs, said member being made from insulating material and having a plurality of holes extending through the length of each leg; a plurality of pairs of capacitors arranged in pairs beneath the base of said member, the leads of each of said capacitors extending through corresponding holes in the outer and center legs of said member; the adjacent lead of each pair of said capacitors extending through the same hole in the center leg of said member; a first pair of transverse slots at one end of said member, a second pair of transverse slots at the other end of said member, a first pair of metallic end pieces each rigidly mounted in one of said first slots, a second pair of metallic end pieces each rigidly mounted in one of said second slits; a first set of inductors arranged adjacent to each other and mounted between two of said end pieces and between said center leg and one of said outer legs, a second set of inductors arranged adjacent to each other and mounted between the remaining two end pieces and between said center leg and the other of said outer legs, a plurality of mica sheets separating said inductors from each other, one of the leads of each of said inductors being directly connected to one of the leads of each of said capacitors, said inductor connected capacitor leads extending through the outer legs of said member, a bus connecting the remaining leads of said capacitors extending through the center leg together; a plurality of hairpin shaped wires mounted in other holes in the outer legs of said member to provide tie points for other leads of said inductors, and two compression devices, one of said compression devices being arranged between an end piece and an adjacent inductor of each of said set of inductors.

12. An electrical assemblage comprising a mounting member, said member having a plurality of holes extending therethrough, a plurality of first components arranged adjacent to each other on one side of said member, a plurality of second components each having first and second wire leads arranged on the other side of said member, the leads of said second components extending through said holes to bracket said first components, the first lead of each of said first components being soldered to a lead of each of said second components, and a common connecting bus, the second leads of each of said second components being bent in alternate directions to support said connecting bus before soldering, the solder preventing the forced withdrawal of said second components.

13. An electrical delay line of the lumped parameter type comprising a U-shaped member, said member having a plurality of holes extending through the sides of said member, a plurality of inductors connected in series and arranged adjacent to each other between the sides of said member, a plurality of capacitors arranged in contact with the other side of said member, the leads of said capacitors extending through said holes to bracket said inductors, a lead of each capacitor being soldered to a lead of an associated inductor, and a bus soldered to the remaining leads of said capacitors to form an electrical delay line, the solder preventing the forced withdrawal of said capacitors.

14. An electrical delay line of the lumped parameter type comprising a U-shaped member having a base and two legs, said member having first and second lines of holes extending through the length of one of said legs, and a third line of holes extending through the length of the other of said legs, a plurality of inductors arranged adjacent to each other between said legs and in contact with the base of said member, a plurality of capacitors arranged adjacent to the other side of the base of said member, the leads of said capacitors extending through said first and third lines of holes in the member to straddle said inductors, and a plurality of tie points inserted in said second line of holes in said member, a lead of each of the inductors being connected to an associated tie point, the remaining leads of said inductors being connected to the associated leads of said capacitors in said first line of holes.

15. An electrical assemblage comprising a base member, said member having first, second and third lines of holes extending therethrough, a plurality of first components arranged on one side of said member, each of said first components having two wire leads extending respectively through said first and second lines of holes, a group of second components bracketed by said first and second lines of holes and arranged on the other side of said member, the leads of said first components in said second line of holes being connected to a portion of the leads of said second components, a plurality of third components mounted in said third line of holes in said member, said third components being connected to the remaining leads of said second components, all of the leads of said second components being near one edge of said base member, and a common connecting bus, the leads of said first components in said first line of holes being bent in alternate directions to support said connecting bus before soldering, a portion of the leads of said first components being angularly bent at the entrances of their corresponding holes to provide taps for said delay line.

16. An electrical delay line of the lumped parameter type comprising an elongated base member, said member having first, second and third lines of holes extending therethrough, said second and third lines of holes being near one edge of said base member, a plurality of capacitors arranged on one side of said member, each of said capacitors having two wire leads extending respectively through said first and second lines of holes, a group of inductors connected in series relation, each inductor having a tap lead, said group of inductors being arranged on the other side of said member, the leads of said capacitors in said second line of holes being connected to an associated tap lead of each of said inductors, and a plurality of tie point means connected to the remaining leads of said inductors, said tie point means being mounted in said third line of holes in said member such that all of the leads of said inductors are near one edge of said base member.

17. A delay line of the lumped parameter type having a plurality of electrical sections comprising at least a first core, said core having a plane face and a grooved face, a second core, said second core having a plane face and a grooved face, the plane face of said second core being arranged adjacent to the grooved face of said first core, a first coil winding mounted in the groove of said first core, a tap on said first coil winding, a second coil winding connected in a series relation with said first coil winding and mounted in the groove of said second core, a tap on said second coil winding, a non-magnetizable spacer arranged between said cores, means including capacitors connected to said taps to form a delay line, the portion of the windings between said taps operating as the inductance for one section of the delay line, said spacer operating to vary the self inductance of said portion of the windings, the magnetic path of each inductance extending through both of said cores, said coil windings being wound in opposite directions.

18. A delay line of the lumped parameter type having a plurality of electrical sections comprising at least a first core, said first core having a plane face and a grooved face, a second core, said second core having a plane face and a grooved face, the plane face of said second core being arranged adjacent to the grooved face of said first core, a spacer made from non-magnetic material separating said cores, a first coil winding mounted in the groove of said first core, a tap on said first coil winding, a second coil winding connected in a series relation with said first coil winding and mounted in the groove of said second core, said coil windings being wound in opposite directions, a tap on said second coil winding, a common connecting bus, a first capacitor connecting the tap of said first coil to the said bus, a second capacitor connecting the tap of said second coil to said bus to form a delay line, the portion of the windings between said taps operating as the inductance for said section of the delay line, the mutual coupling between adjacent sections of the delay line being controlled by the position of the operated tap, the magnetic path of said inductance extending through both of said cores, the thickness of said spacer operating to control the self inductance of each of each associated section.

19. A delay line comprising a plurality of coil windings connected in series relation, a plurality of cores adjacent to each other, each of said coil windings being arranged within one of said cores, a tap on each of said coil windings, a plurality of inductors each comprising the portions of said coil windings between adjacent taps, the magnetic circuit of each inductor including a portion of the adjacent core, and a plurality of non-magnetizable spacers each interposed between adjacent cores to control the self inductance of the associated inductor by controlling the reluctance of the magnetic circuit of said associated inductor, the mutual inductance between adjacent inductor being determined by the position of the associated taps, each of said coil windings being wound in a direction opposite the direction of the adjacent coil winding to minimize the amount of mutual inductance between each coil winding and the other coil windings due to common flux linkages from said other coil windings, and means including capacitors connected to said taps to form a delay line.

20. A delay line comprising a plurality of cores adjacent to each other, a plurality of coil windings connected in series relation, each of said coil windings being associated with one of said cores, a tap on each of said coil windings, a plurality of inductors each comprising the portions of said coil windings between adjacent taps, the magnetic circuit of each inductor including a portion of the back of the adjacent core, a plurality of non-magnetizable spacers each interposed between adjacent cores to control the self inductance of the associated inductor by controlling the reluctance of the magnetic circuit of said associated inductor, the width of the back of the adjacent core reducing the mutual inductance between adjacent inductors which is due to the proximity of the adjacent coil windings, the mutual inductance between adjacent inductors thereby being primarily determined by the position of the associated tap, a plurality of capacitors, and means connecting said capacitors to said taps of said inductors to form a delay line.

21. A delay line comprising a plurality of cores adjacent to each other, a plurality of coil windings connected in series relation, each of said coil windings being associated with one of said cores, a tap on each of said coil windings, a plurality of inductors each comprising the portions of said coil windings between adjacent taps, the magnetic circuit of each inductor including a portion of the back of the adjacent core, a plurality of non-magnetizable spacers each interposed between adjacent cores to control the self inductance of the associated inductor by controlling the reluctance of the magnetic circuit of said associated inductor, each of said coil windings being wound in a direction opposite the direction of the adjacent coil winding to minimize the amount of mutual inductance between each coil winding and the other coil windings due to the proximity of the coil windings, the gaps formed by said non-magnetizable spacers and the backs of said cores also reducing the mutual inductance between adjacent inductors which is due to the proximity of the adjacent coil windings, the mutual inductance between adjacent inductors thereby being primarily determined by the position of the associated tap, a plurality of capacitors, and means connecting said capacitors to said taps of said inductors to form a delay line.

22. A delay line comprising a plurality of coil windings connected in series relation, a plurality of cores adjacent to each other, each of said cores being associated with one of said coil windings, a tap on each of said coil windings, means including capacitors connected to said taps to form a delay line, a plurality of inductors each comprising the portions of said coil windings between adjacent taps, the magnetic circuit of each inductor including the back of the adjacent core, and a plurality of non-magnetic spacers each interposed between adjacent cores to control the self inductance of the associated inductor by controlling the reluctance of the magnetic circuit of said associated inductor, the back of each of said cores providing a relatively low reluctance path to reduce mutual inductance due to proximity of said coil windings, the mutual inductance between adjacent inductors thereby being primarily controlled by the position of the associated tap.

References Cited in the file of this patent

UNITED STATES PATENTS

| | | |
|---|---|---|
| Re. 20,224 | Van Billiard | Dec. 29, 1936 |
| 1,809,560 | Milnor | June 9, 1931 |
| 1,815,629 | Milnor et al. | July 21, 1931 |
| 1,993,494 | Weiscopf | Mar. 5, 1935 |
| 2,270,166 | Heinsch et al. | Jan. 13, 1942 |
| 2,390,563 | Tawney | Dec. 11, 1945 |
| 2,466,192 | Wood | Apr. 5, 1949 |
| 2,512,162 | Lips | June 20, 1950 |
| 2,517,848 | Del Camp | Aug. 8, 1950 |
| 2,560,568 | Hammond et al. | July 17, 1951 |

FOREIGN PATENTS

| | | |
|---|---|---|
| 926,456 | France | Apr. 21, 1947 |

U. S. DEPARTMENT OF COMMERCE

PATENT OFFICE

CERTIFICATE OF CORRECTION

Patent No. 2,823,354 February 11, 1958

Samuel Lubkin

It is hereby certified that error appears in the printed specification of the above numbered patent requiring correction and that the said Letcers Patent should read as corrected below.

Column 8, line 40, claim 2, after "through" strike out "in"; column 9, line 40, claim 6, for "pieecs" read -- pieces --; line 75, claim 8, for "fist" read -- first --; column 11, line 19, claim 11, for "slits" read -- slots --.

Signed and sealed this 15th day of April 1958.

(SEAL)
Attest:

KARL H. AXLINE
Attesting Officer

ROBERT C. WATSON
Commissioner of Patents